United States Patent [19]

Schmittle

[11] Patent Number: 4,568,043
[45] Date of Patent: Feb. 4, 1986

[54] ULTRA-LIGHT AIRCRAFT WITH FREELY ROTATING RIGID WING

[76] Inventor: Hugh J. Schmittle, P.O. Box 790, Savern, Md. 21144

[21] Appl. No.: 588,079

[22] Filed: Mar. 9, 1984

Related U.S. Application Data

[63] Continuation-in-part of Ser. No. 544,261, Oct. 21, 1983.

[51] Int. Cl.[4] .................................................. B64C 3/38
[52] U.S. Cl. ............................................ 244/48; 244/13; 244/16; 244/DIG. 1.3
[58] Field of Search ...................... 244/13, 16, 48, 49, 244/76 R, DIG. 1, 76 C, 46

[56] References Cited

U.S. PATENT DOCUMENTS

| | | |
|---|---|---|
| D. 243,594 | 3/1977 | Koch . |
| 1,022,903 | 4/1912 | Warrick ........................... 244/76 R |
| 1,038,306 | 9/1912 | Davidson . |
| 1,145,013 | 7/1915 | Gallaudet ..................... 244/DIG. 1 |
| 1,631,603 | 6/1927 | Raynolds ............................. 244/48 |
| 1,861,318 | 5/1932 | Page . |
| 2,160,089 | 5/1939 | Schairer . |
| 2,381,679 | 8/1945 | Maxwell . |
| 2,430,793 | 11/1947 | Wells . |
| 2,623,712 | 12/1952 | Spratt . |
| 2,792,191 | 5/1957 | Perry ..................................... 244/48 |
| 3,017,137 | 1/1962 | Helmke et al. . |
| 3,135,483 | 6/1964 | Girard . |
| 3,140,842 | 7/1964 | Craigo . |
| 3,269,674 | 8/1966 | Girard . |
| 3,361,388 | 1/1968 | Girard . |
| 3,477,664 | 11/1969 | Jones . |
| 3,561,702 | 2/1971 | Jones . |
| 3,730,459 | 5/1973 | Zuck . |
| 3,795,373 | 3/1974 | Gerard . |
| 4,068,810 | 1/1978 | Malewicki . |
| 4,124,180 | 11/1978 | Wolowicz . |
| 4,158,448 | 6/1979 | Mochizuki . |
| 4,262,863 | 4/1981 | Slusarczyk . |

OTHER PUBLICATIONS

Spratt, George, "The Controlwing Aircraft", Sport Aviation, Jun. 1974.
Poynter, "Hang Gliding", 1976, p. 143.

Primary Examiner—Galen L. Barefoot
Attorney, Agent, or Firm—Lowe, King, Price & Becker

[57] ABSTRACT

An ultra-light aircraft of light-weight minimal construction includes a rigid wing from which a hang cage is suspended by a main hinge assembly. Rotation of the wing without pilot intervention induced by positive or negative wind gusts striking the wing causes the angle of pitch between the wing and hang cage to vary via the hinge so that the wing presents a relatively constant angle of attack to relative wind enabling the aircraft to be essentially stall free during flight. Twist and/or dihedral of the wing is maintained by first and second sets of tensioned cables or landing wires connecting leading and trailing wing edges to a kingpost projecting upward from the wing, and by first and second sets of flying wires connecting the wing to the hang cage. Each first and second set of flying wires is a stress distributing arrangement including a pair of tubes respectively connected at upper ends thereof to leading and trailing wing edges and at lower ends to a plate suspended between the wing and hang cage. A pair of tensioned cables in each set connect the plate to the hang cage. The point of attachment of the cables to the plate establishes a pivot point located collinear with the hinge axis. The tubes are free to rotate about the pivot point during co-rotation of the wing while maintaining proper dihedral and wing twist as well as tension transmitting bending stress acting on the wing to the hang cage.

19 Claims, 11 Drawing Figures

ULTRA-LIGHT AIRCRAFT WITH FREELY ROTATING RIGID WING

RELATED APPLICATIONS

This is a continuation-in-part application of my co-pending U.S. patent application Ser. No. 544,261 filed Oct. 21, 1983.

TECHNICAL FIELD

The present invention generally relates to aircraft having a wing free to rotate about a spanwise axis to maintain a constant angle of attack with relative wind and, more particularly, to an ultra-light aircraft having a freely rotating rigid wing.

BACKGROUND ART

In my co-pending U.S. patent application mentioned above, there is disclosed an ultra-light aircraft wherein a hang cage is suspended from a collapsible Rogallo type wing by a main hinge assembly. The wing includes a longitudinal keel of light-weight tubular construction, leading edge members and a cross brace. A flexible lifting panel is secured along and between these members to establish a lifting surface. The hinge is clamped to the keel permitting free rotation of the wing about a spanwise axis extending longitudinally through the cross brace.

Rotation of the wing without pilot intervention induced by positive or negative wind gusts striking the flexible panel causes the angle of incidence or pitch between the wing and hang cage to vary so that the wing presents a constant angle of attack to relative wind enabling the aircraft to be essentially stall-free during flight. A cable and spreader tube arrangement interconnecting forward and trailing ends of the keel to the cross brace undergoes tension and compression loading to distribute bending stress acting on the keel during excessive wing loading to other parts of the aircraft.

The aforesaid spreader tube and cable arrangements operate satisfactorily to alleviate excessive aerodynamic wind loading in the hinged Rogallo wing of my prior invention without interfering with rotation of the wing. However, I have found that the aforesaid arrangement will not operate satisfactorily to alleviate excessive wing loading in conjunction with a rigid wing hinged to a hang cage due to their aerodynamic and structural differences with flexible wings, as described below.

A rigid wing generally comprises a pair of forward and rear tubes paired together on each side of the aircraft to establish leading and trailing edges of the wing. The paired forward and rear tubes are connected together by short longitudinal tubes bent in the shape of an airfoil with a single layer of fabric (e.g., Dacron) stretched across the resulting wing frame to establish lifting surfaces. Each pair of forward tubes are preferably connected together as is each pair of rear tubes so that the wing assumes a predetermined dihedral relative to the horizontal for improved stability during flight.

In conventional ultra-lights, the aforesaid rigid wing is fixed to struts extending upwardly from the hang cage so that the wing is non-pivotal in nature. A kingpost extends vertically upward from the wing. A pair of cables or landing wires respectively connect the leading and trailing edges of each wing tip to the kingpost. The cables are tensioned and are of different length so that the wing tip assumes a preset angle of pitch relative to a horizontal plane passing through the longitudinal axis of the fuselage or hang cage. A second pair of landing wires connect leading and trailing edges of an intermediate section of each wing to the kingpost. The second pair of landing wires are also of different length from each other so that the intermediate section of the wing assumes a preset angle of pitch that is greater than the wing tip angle of pitch. In other words, due to the inherent flexibility of the tubular members establishing the wing frame, each wing is 'twisted' a small predetermined amount by the landing wires relative to a horizontal plane, so that the angle of pitch gradually decreases from the wing root proximate the keel to the tip. Corresponding first and second pairs of cables or flying wires project downward to connect the tip and intermediate sections of each wing to the hang cage to assist the landing wires in establishing wing twist and dihedral.

Wing twist characteristics are important to allow the tip sections of the rigid wing to assume a lower angle of attack with relative wind during flight than inboard sections of the wing. Thus, should the wing approach a stall condition during flight, the tip sections are less likely to stall than the inboard sections so that aircraft remains controllable. The flying and landing wires also assist in transmitting to the hang cage bending stress or excessive wing loading induced by upward or downward wind gusts striking the wing.

To obtain a rigid, free wing ultra-light configuration, it is not possible to modify the aforesaid conventional fixed wing design simply by hinging the rigid wing to the hang cage. This is because each flying and landing wire attached to forward and trailing edges in the conventional, rigid wing ultra-light described above is of fixed effective length that would tend to prevent the wing from rotating about a spanwise axis when the wings are designed with twist and/or dihedral in the manner described above. Since rigid wings are most efficient and give better control than flexible wings, and are commercially preferred, a freely rotatable, rigid wing ultra-light would be desirable to obtain the advantages afforded by free wings and rigid wings.

It is accordingly an object of the present invention to provide an improved free wing especially for ultra-light aircraft as well as for conventional aircraft employing a wing having dihedral and/or twist characteristics.

Another object of the present invention is to provide a free wing for rigid wing ultra-light aircraft having improved gust alleviation characteristics.

Still a further object is to provide an effective means for hinging a rigid wing to the hang cage so that the wing is free to rotate in pitch without effecting the dihedral and/or twist characteristics of the wing.

Yet another object is to provide a free rigid wing wherein bending or aerodynamically induced wing loads are converted into tension and compression loads distributed to other parts of the aircraft to minimize excessive wing loading.

A further object is to provide a free rigid wing in an ultra-light aircraft utilizing a simple, inexpensive yet reliable hinging mechanism for securing the wing to the aircraft.

Yet another object is to provide a simple, inexpensive yet reliable mechanism to assist in maintaining the dihedral and/or twist characteristics of the wing while simultaneously transferring excessive wing loading to the fuselage or hang cage as the wing rotates about the hinge to automatically vary its angle of pitch without pilot intervention in response to changes in flight conditions.

DISCLOSURE OF INVENTION

An aircraft according to the present invention, especially an ultra-light aircraft, comprises a fuselage connected to a wing by a pitch hinge bracket. The hinge permits the wing to freely rotate without pilot intervention about a spanwise axis extending generally perpendicular to the fuselage longitudinal axis so that lifting surfaces of the wing maintain a substantially constant angle of attac with relative wind irrespective of abrupt changes in relative wind tending to be caused by wind gust. A connecting means attached to a section of each wing remote from the hinge connects the wing to the fuselage. The connecting means is tensioned to transmit bending stress loads from the wing to the fuselage to alleviate excessive wing loading. The connecting means includes means for automatically adjusting by permitting movement of the connecting means in response to wing rotation (1) a first effective distance measured by a straight line between a point of connection of the connecting means with the wing to a point of attachment of the connecting means on the fuselage and (2) a second effective distance measured by a straight line between a point of connection of the connecting means with the wing to a point of attachment of the connecting means on the fuselage so that the connecting means remains under tension to distribute bending stress to the fuselage during and without interfering with rotational movement of the wing about the hinge.

The wing is preferably a rigid wing having forward and rear tubular members connected to extend transversely from opposite sides of the fuselage to respectively establish leading and trailing wing edges. The forward and rear members are connected together by short longitudinal tubes to define a wing frame therewith with one of the tubes located centrally between opposite ends of the wing being a keel. Fabric material or the like covers the wing frame to establish lifting surfaces exposed to relative wind during flight to create lift. In a preferred embodiment of the invention, the rigid wing has a predetermined amount of dihedral canting the wing upwardly and twist that gradually reduces the angle of pitch or incidence of the wing from the keel to the tip to prevent the wing tips from stalling. The twist and/or dihedral is preferably maintained by first and second sets of tensioned cables or landing wires connecting leading and trailing wing edges to a kingpost projecting upward from the wing. The connecting means preferably includes a first pair of inclined tubes having upper ends respectively connected to leading and trailing wing edges and lower ends projecting downward from the wing for attachment to a plate suspended by the tubes between the fuselage and wing. A first pair of cables respectively connect the plate to separate fore and aft points on the fuselage. The plate establishes a pivot point located in the same elevational and vertical planes as the hinge axis so that rotation of the wing induces corresponding rotation of the tubes about the pivot point without varying dihedral and/or wing twist and while maintaining tension to distribute bending stress loads acting on the wing to the fuselage.

In accordance with the invention, the tubular connecting members define a first plane established with a part of the wing located between the points of attachment of the members to the wing. The lower end of the first plane terminates at the pivot point. The cables of the connecting means define a second plane established with a part of the fuselage extending between the points of attachment of the cables to the fuselage. The second plane has an upper end terminating at the pivot point. During wing rotation about the hinge, the first and second planes are free to rotate relative to each other about the pivot point so that bending stress on the wing continues to be transmitted through the pivot point to the fuselage without creating forces in the connecting means tending to inhibit rotation of the wing.

In accordance with yet another aspect of the invention, the connecting means can be utilized in conjunction with a flexible or Rogallo wing having cross members projecting upwardly and outward from a central longitudinal keel to establish dihedral. In a rotating, flexible wing ultra-light aircraft, dihedral is maintained by a series of cables or landing wires connecting the cross members of the wing to a kingpost projecting vertically upward from the keel. In this embodiment, the connecting means is preferably a single fitting attached to the cross bars. The fitting is rigid and projects downward to a point collinear with the hinge axis. A pair of tension cables connect the fuselage or hang cage to this point located on the fitting. In this arrangement, the point establishes a pivot point remaining collinear with the hinge axis while permitting bending stress loads acting on the wing to be transmitted through the cable to the hang cage without impairing freedom of rotational movement of the wing.

Still other objects and advantages of the present invention will become readily apparent to those skilled in this art from the following detailed description, wherein I have shown and described only the preferred embodiments of the invention simply by way of illustration of the best mode contemplated by me of carrying out my invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figures 1, 2, 3, 10, 11:
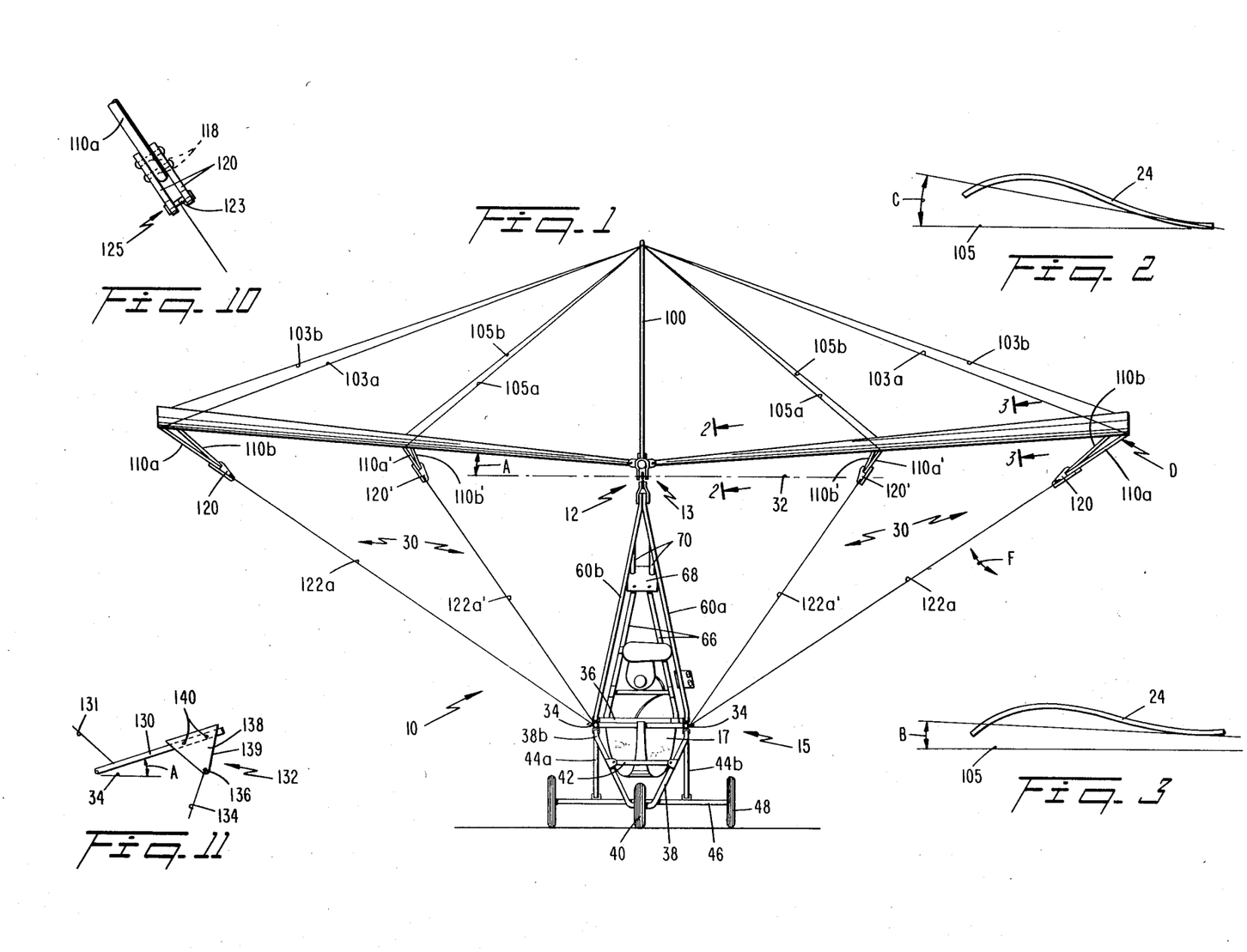
FIG. 1 is a front elevational view of a free rigid wing in an ultra-light aircraft embodying the principles of my invention.
FIG. 2 is a sectional view taken along the line II—II of FIG. 1.
FIG. 3 is a sectional view taken along the line III—III of FIG. 1 showing a variation in angle of pitch at different sections of the wing when viewed in conjunction with FIG. 2.
FIG. 10 is a partial, detailed view of a preferred form of connecting means when viewed orthogonal to the illustration of FIG. 9.
FIG. 11 is a partial front elevational view of a second embodiment of connecting means employed in a flexible wing ultra-light aircraft.
Figures 4, 5, 6, 7, 8, 9:
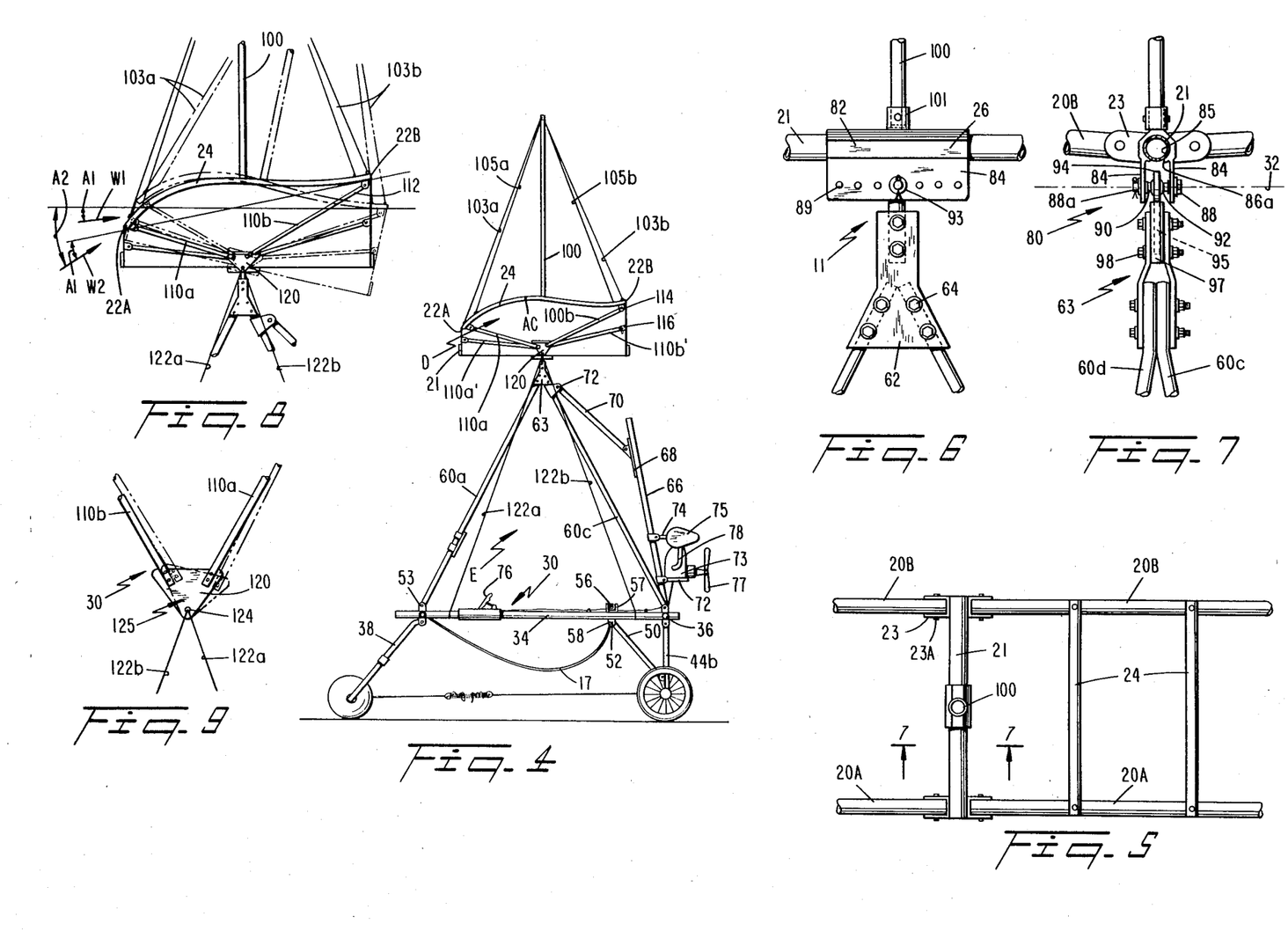
FIG. 4 is a side elevational view of the rigid wing ultra-light aircraft shown in FIG. 1.
FIG. 5 is a detailed, partial top view of a central portion of the rigid wing located proximate the hinge.
FIG. 6 is a partial, side elevational view of a pitch hinge mounting bracket and ball joint connection pivotally connecting the wing to the hang cage.
FIG. 7 is a partial front elevational view to further illustrate the ball joint connection.
FIG. 8 is a partial side elevational view of the rigid free wing in various rotational positions about the hinge induced by positive and negative wind gust loading.
FIG. 9 is a detailed partial side elevational view of a preferred form of connecting means embodying the principles of the invention.

Referring to FIG. 1, aircraft 10 comprises a wing 12 from which is uniquely suspended by a main hinge assembly 13 a hang cage 15 carrying a pilot (not shown) in seat 17 or carrying some other suitable payload. Wing 12 is of a rigid construction and, as best shown in FIG. 5, comprises forward and rear tubes 20A and 20B paired together to project laterally from each side of hang cage 15 to establish leading and trailing edges 22A and 22B of the wing, respectively. Each pair of tubes 20A, 20B is connected with brackets 23 and bolts 23A to a central tubular keel 21. The paired tubes 20A, 20B are also connected together by identical short longitudinal tubes or ribs 24 in a well known manner which are bent in the shape of an airfoil (see, e.g., FIG. 2). A layer of fabric (not shown) is stretched to cover the resulting wing frame to establish lifting surfaces. Wing 12 is pivotally secured to hang cage 15 via clamping engagement of a hinge bracket 26 with keel 21 (FIGS. 6 and 7). Since the rigid wing preferably has a predetermined amount of dihedral (approximately 5° to 8°), a unique stress distributing mechanism 30 of the invention is connected to transmit bending stress loads from the wing to the hang cage, without interfering with rotation of the wing about the hinge, in the unique manner described below.

Hinge bracket 26 forms a part of main hinge assembly 11 connecting wing 12 to hang cage 15 in the unique manner described below so that the wing is free to rotate without pilot intervention about a spanwise axis 32 extending longitudinally through the wing. Rotation of wing 12 without pilot intervention induced by positive or negative wind gusts striking lifting surfaces of the wing causes the angle of incidence between the wing and hang cage 15 to vary so that the wing presents a relatively constant angle of attack to the relative wind enabling aircraft 10 to be essentially stall-free during flight and capable of dumping excessive wind loadings from the wing to avoid structural failure thereof and to increase pilot comfort in turbulence.

Hang cage 15 comprises a pair of longitudinal, parallel tubular members 34 interconnected at opposite ends by forward and rear cross tubes 36 defining a rectangular base frame 30. Projecting downward from forward ends of members 34 is a U-shaped nose wheel landing gear leg 38 rotatably supporting a nose wheel 40 at a lower apex thereof. A cross brace 42 interconnects intermediate portion of legs 38 between lower apex 38 and upper ends 38b for maximum strength. A pair of main landing gear legs 44a and 44b extend vertically downward from rear ends of tubular members 34 respectively to rigidly support an axle 46 carrying a pair of main landing wheels 48 at opposite ends thereof. Main legs 44a and 44b are reinforced by support struts 50 inclined upwardly and forwardly to connect lower ends of the main legs to frame members 34 with brackets 52. Seat 54, preferably of canvas or like material, is slung between members 34 and supported at forward and rear ends by forward cross tube 36 and a cross support tube 56 supported between members 34 on U-shaped bracket 57.

The above structural members defining hang cage 15 are basically tubular for minimum weight with maximum strength and utilize U-shaped brackets (e.g., 52) and quick release pins 58 to simplify interconnection and rapid disassembly of the various components. However, it will be appreciated that other types of fuselage can be suspended from wing 12 by hinge 11 without departing from the invention.

To interconnect hang cage 15 to wing 12 in the unique manner below, four of hang cage tubular struts 60a, 60b, 60c and 60d are respectively connected to forward and rear ends of members 34 with brackets 53 and pins 58 and converge upwardly therefrom to a point above seat 17 where upper ends of the struts are each respectively fixed to a lower triangular flange skirt portion 62 of a pair of hinge connecting plates 63 with bolts 64 (see FIGS. 6 and 7). Extending upwardly and forwardly from lower ends of member 34 is a pair of engine support struts 66 connected together at upper portions thereof with a plate 68. The plate 68 defines the apex of a triangle formed by these tubes. A pair of support tubes 70 are inclined forwardly to interconnect plate 68 to upper ends of hang cage rear struts 60c and 60d with brackets 72 at a point beneath hinge plates 63.

Engine mountings 72 carrying an engine 73 and fuel tank mountings 74 carrying fuel tank 75 are fixed to support struts 66 to support the engine and tank behind seat 17. Engine 73, which is illustrated as a small internal combustion engine driving a pusher propeller 77, is supplied with fuel from tank 75 through fuel line 78, with the fuel supply to the engine carburetor conventionally controlled by a throttle 76 mounted on left hand tubular member 34. The specific engine and fuel mountings will depend on the engine and fuel tank used, that shown being typical. Suitable flight controls, such as left and right wing type rudders and an elevator or 'stabilator" (not shown), may be incorporated within aircraft 10 in a conventional manner.

Referring to FIGS. 6 and 7 main hinge assembly 11 comprises pitch hinge bracket 26 pivotally connected to hinge connecting plates 63 by means of a ball joint connection 80 located slightly aft of the aerodynamic center of lift of wing 12, as indicated at AC in FIG. 2.

Hinge bracket 26 is of unitary construction having a longitudinally extending upper sleeve member 82 integrally formed with a pair of longitudinal parallel bracket arms 84 extending vertically downward therefrom. A longitudinal mounting channel 85 having an internal cylindrical wall extends through sleeve 82 and is open at opposite ends thereof to receive keel 21 in clamping engagement. More specifically, channel wall 85 is open at a bottom 86a thereof in communication with the space between bracket arms 84 so that during initial mounting of wing 12 to hang cage 15, the bracket arms can be gently spread apart temporarily to enlarge channel 85 enabling the keel to be received in the channel through bottom 86a thereof. Thereafter, outer cylindrical surfaces of keel 21 are tightly clamped against the channel cylindrical wall in strong frictional contact by means of a bolt 88 and butterfly nut 88a extending transversely through one set of plural aligned holes 89 in bracket arms 84.

A stub shaft 90 carried by bolt 88 extends transversely between bracket arms 84 and includes a spherical ball 92. The ball 92 is captured within a concave cylindrical track 93 of a socket 94 forming the upper end of a rod end bearing shaft 95. The lower shaft portion of rod end bearing shaft 95 is received within a hollow cylindrical sleeve 97 and affixed thereto by a locking pin (not shown) passing radially through the sleeve and shaft. Nut and bolt connections 98a are used to fix sleeve 97 between parallel arms integrally formed with and extending upwardly from lower flanges 62 of hinge connecting plate 63 so that the ball joint connection 80 defined by ball 92 and socket 94 is located above hang cage support struts 60a–60d and beneath keel 21.

Ball joint connection 80, connecting wing 12 to cage 15, permits clockwise and counterclockwise rotation of the wing about spanwise axis 32 (i.e., by virtue of ball 92 smoothly rotating in a vertical plane within socket 94) through a predetermined angular interval as well as limited roll about a longitudinal axis of the keel, as will be discussed more fully below.

Main hinge assembly 11 operates as follows. Assume that aircraft 10 as shown in FIGS. 1 and 8 is in straight and level flight at a predetermined power setting of engine 73. In this flight attitude, relative wind vector W1 is oriented horizontally to strike the underside of wing 12 at an angle of attack A1 (at a particular wing section) to produce lift. Now assume that aircraft 10 suddenly encounters an upward wind gust causing the relative wind vector to shift counterclockwise to W2 and form an angle of attack A2 with wing 12, where A2 is greater than A1. In a conventional fixed wing aircraft, angle of attack A2, depending on the magnitude of relative wind vector W2, could possibly exceed the design angle of attack of the fixed wing causing the aircraft to pitch up and stall. However, in aircraft 10 of the invention, as relative wind vector W1 changes to W2, the increased wind mass suddenly striking the major portion of wing 12 located aft of main hinge assembly 11 causes the wing to rotate counterclockwise about spanwise axis 32 via ball joint connection 80 by virtue of the greater lift component now acting on the wing aft of the hinge. Wing 12 thus pitches down into the solid line position shown in FIG. 8 and thereby dumps the wind gust load from the wing, assisted by stress distributing arrangement 30 as discussed below. Thus, at a predetermined power setting wing 12 tends to seek neutral stability by self adjusting about pitch axis 34 to maintain a constant angle of attack A1 with new relative wind vector W2. Of course, hinge 11 causes the angle of incidence formed between wing 12 and hang cage 15 to change (i.e., decrease) when the wind vector becomes W2, assuming that the cage remains in a neutral, horizontal attitude without being buffeted about. By this means, pitch fluctuation of wing 12 is effectively damped and aircraft 10 is very stable since main hinge assembly 11 provides very effective automatic stability since any pitching motion of the wing due to flight conditions not intentionally caused by the pilot will cause a change in angle of incidence without substantially effecting angle of attack A1.

As illustrated in FIGS. 1 and 6, a kingpost 100 connected to hinge bracket 26 with a coupling 101 extends vertically upward from wing 12. A pair of inclined landing wires or cables 103a, 103b respectively connect leading and trailing edges 22a, 22b of each wing tip to the kingpost. Landing wires 103a, 103b are tensioned to establish wing dihedral (angle A) by exerting an upward force on wing 12. The forward wire 103a is longer than rear wire 103b so that the wing tip assumes a preset fixed angle of pitch B relative to the longitudinal axis 105 of hang cage 15. A second pair of tensioned landing wires 105a and 105b attached to leading and trailing wing edges 22a, 22b intermediate the wing tip and keel are also connected to kingpost 100. Wire 105a is longer than wire 105b so that the intermediate wing section assumes a preset fixed angle of pitch C, where C is greater than B. In this manner, because of the inherent flexibility of the aforesaid tubular members establishing the wing frame, each wing is 'twisted' by landing wires 103a, 103b and 105a, 105b relative to a horizontal plane which can be parallel to axis 105 (FIGS. 2 and 3) passing through the wing so that the angle of pitch gradually decreases in the direction of the wing tips.

Wing twist is important to allow the tip sections of the wing to assume a lower angle of attack with relative wind during flight than inboard wing sections. Thus, should the wing approach a stall condition during flight, the tip sections are generally less likely to stall than the inboard sections so that the aircraft remains controllable.

Stress distributing arrangement 30 of the invention function as flying wires to assist the landing wires in setting both wing twist and dihedral as well as distribute bending stress loads acting on wing 12 to hang cage 15. As best shown in FIGS. 1 and 4, the arrangement 30 comprises a first pair of tubular members 110a and 110b having upper ends 112 secured to leading and trailing wing tip edges 22a, 22b with U brackets 114 and pins 116. The tubes 110a, 110b, which may also be wires, are inclined downwardly towards hang cage 15. As best shown in FIGS. 9 and 10, lower ends of each tube 110a, 110b are respectively secured with bolts 118 to upper corners of a juxtaposed pair of triangular connecting plates 120. A first pair of wires 122a and 122b having lower ends attached to base frame 34 at longitudinal spaced locations extend upward for connection with a pin 123 to the lower end or apex 124 of plates 120. Likewise, a second pair of tubes 110a', 110b' connecting to leading and trailing wing edges 22a, 22b at an intermediate station of each wing are connected via plates 120' and wires 122a', 122b' to the hang cage.

Each pin 123 establishes a pivot point 125 that generally lies collinear in the same elevational and vertical planes as hinge axis 32 (FIGS. 1 and 8) defined by ball joint connection 80. Further, the first and second pairs of wires 122a, 122b and 122a' and 122b' are tensioned to assist the landing wires in setting and maintaining during flight the desired dihedral and wing twist characteristics, as well as to transmit excessive wing loading to the hang cage. Because of wing twist, the forward tubes 110a, 110a' are of different length and usually shorter than their associated rear tubes 110b, 110b', respectively.

As relative wind vector W1 changes to W2 causing wing 12 to pitch down from the phantom to the solid line position as explained above, it will be appreciated that all points on the wing remote from the hinge and lying in common planes orthogonal to spanwise axis 32 will move in an arcuate path having an imaginary center of rotation located in the orthogonal plane and along the spanwise axis. Thus, since pivot points 125 are positioned along axis 32 as explained above, tubes 110a, 110b (110a', 110b') as well as pivot plate 120 (120') are free to rotate synchronously with the wing as it pitches down in response to wind vector W2 while pivoting about the associated pivot point 125 from the phantom to solid line positions shown in FIG. 9. As wing rotation occurs, a large part of the wind gust load is dumped from the wing. Simultaneously, since each pair of wires 122a, 122b and 122a', 122b' of stress distributing arrangement 30 remain under tension any additional wing bending stress induced by wind gust loads is effectively transmitted to hang cage 15 through the aforesaid stress distributing tubes and wires. In addition, since stress distributing tubes 110a, 110b and 110a', 110b' are free to pivot with plate 120 (120') about point 125 (which remains essentially immovable because of the flying wires 122a, 122b), dihedral and wing twist characteristics are advantageously maintained since the straight line distance measured between any point of connection of the stress distributing tubes to elading and trailing wing edges 22a, 22b with respect to any point of connection of the flying wires on base frames 34 are made variable by virtue of the pivotal displacement of the stress tubes and plate about pivot points 125. In other words, with stress distributing arrangement 30, tubes 110a, 110b and 110a', 110b' establish with plates 120, 120' and wing 12 rigid structures pivotable about their pivots 125 in response to wing rotation independent of and without being constrained by connections to hang cage 15.

Although a plane D defined between stress distributing tubes 110a, 110b, plate 120 and a section of wing 12 between leading and trailing edge connection points 22a, 22b is essentially coplanar with a plane E established between flying wires 122a, 122b and a section of base frame 34 located between the hang cage connection points when aircraft 10 is in straight and level flight, the structures defining these planes are free to rotate somewhat relative to each other in their respective planes about pivot point 125 in the direction of arrow F during wing rotation. This rotation creates a small bending moment within plates 120, 120' that tends to weaken the stress tube and pivot plate connections achieved with bolts 118. For this reason, as shown in FIG. 10, it is preferable to sandwich and connect the lower ends of tubes 110a, 110b between a juxtaposed pair of plates 120 with plural bolts 118 for improved attachment conditions.

FIG. 11 illustrates a second embodiment of stress distributing arrangement 30 for use in connection with a Rogallo or flexible wing (not shown in detail) wherein a pair of cross bars 130 projecting laterally from a central longitudinal keel and connected to rear portions of leading edge tubular members (not shown) extending outward and rearward from a forward end of the keel is canted upwardly by landing wires 131 to establish dihedral (see angle A) in the flexible wing. Where dihedral is present in a flexible wing, a U-shaped fitting 132 attached to the outer end of each cross bar projects downward to establish a point of connection lying generally along the hinge axis 32 to which upper ends of flying wires 134 are attached, as shown in FIG. 11. Thus, since the fitting 132 establishes a pivot point 136 at the point of connection of the flying wires to the fitting along the hinge axis, it will be appreciated that rotation of the wing cause co-rotation of cross bars 130 and fittings 132 so that the fitting rotates about the immovable pivot point 136. Thus, with this arrangement, flying wires 134 transmit excessive wing loading to the hang cage without affecting wing dihedral since the tensioned flying wires remain generally stationary while the fitting co-rotates with the wing about point 136. In addition, fitting 132 can be connected to one of the ribs intermediate leading and trailing edges 22a, 22b in a rigid wing ultralight (not shown) to locate pivot point 136 along an imaginary line extending through hinge axis 34 in situations where the flying and landing wires do not preset wing twist but are only used to establish dihedral. In either case, the U-shaped fitting 132 includes parallel side walls 138 connected to a bottom wall 139. Upper edges of side walls 138 are connected to cross tubes 130 with bolts 140 as shown in FIG. 11.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:
1. An aircraft, comprising:
   (a) a fuselage;
   (b) a rigid wing having forward and rear tubular members connected to extend transversely from opposite sides of the fuselage to respectively establish leading and trailing wing edges, said forward and rear members being connected together by short longitudinal tubes to define a wing frame therewith with one of said tubes located centrally between opposite ends of the wing being a keel, and fabric material and the like covering the wing frame to establish lifting surfaces exposed to relative wind during flight to create lift;
   (c) a pitch hinge bracket means for connecting the fuselage to the keel, said hinge bracket means permitting the rigid wing to freely rotate without pilot intervention about a spanwise axis extending generally perpendicular to the keel longitudinal axis so that the lifting surfaces of the wing maintain a substantially constant angle of attack irrespective of abrupt changes in relative wind tending to be caused by wind gusts; and
   (d) first means for connecting leading and trailing edges of the wing to the fuselage at a section of the wing remote from the hinge to establish a fixed, invariable amount of wing twist or dihedral in cooperation with a second means mounted above the wing and connected to said leading and trailing edges; said first means being tensioned to transmit bending stress loads from the wing to the fuselage to alleviate excessive wing loading, said first means including means responsive to rotation of the wing about the hinge for automatically adjusting (1) a first effective distance between a point of connection of the connecting means with the leading edge and a first point of connection of the connecting means with the fuselage and (2) a second effective distance between a point of connection of the connecting means with the trailing edge and a second point of connection of the connecting means with the fuselage, said automatic adjusting means lying along the hinge axis and being generally coplanar with said first connecting means and points of connection of said first connecting means with said fuselage and said leading and trailing edges, said adjusting means permitting the connecting means to yield to rotational movement of the wing whereby said automatic adjustment means enables the first connecting means to remain under constant tension to distribute stress from the wing without interrupting rotational movement of the wing about the hinge, said first means being mounted outside and laterally spaced from the fuselage to prevent manipulation thereof by the pilot.

2. The aircraft of claim 1, wherein said second means includes a kingpost connected to project upward from the wing, and a pair of cables or landing wires connecting the kingpost to leading and trailing edges of the wing proximate said points of connection, said landing wires being tensioned to set dihedral and wing twist such that an angle of pitch formed between the wing and a horizontal plane gradually decreases towards the wing tips.

3. The aircraft of claim 2, wherein said connecting means includes a first pair of tubes having upper ends respectively connected to leading and trailing wing edges and lower ends projecting downward from the wing for attachment to a first plate suspended by the tubes between the fuselage and wing, and a first pair of cables connected between the plate to separate points on the fuselage, said plate establishing a pivot point located in the same elevational and vertical planes as the hinge such that rotation of the wing about the hinge induces corresponding rotation of the tubes about the pivot point on the plate without varying dihedral and wing twist.

4. The aircraft of claim 3, wherein said plate is co-planar with the tubes and first pair of cables when the wing keel is at a predetermined angle of pitch during flight and the wing is generally stationary relative to a plane of rotation.

5. The aircraft of claim 3, wherein said first pair of tubes and first pair of cables operate as tensioned flying wires and coact with the landing wires to preset dihedral and wing twist, a forward tube of said first pair thereby being shorter than the rearward tube of the first pair.

6. The aircraft of claim 3, wherein the lower ends of said tubes in the first pair are connected to an upper portion of the plate at spaced locations from each other, upper ends of said cables in the first pair of cables being connected together and to the plate at a point below the lower ends of the tubes, said point establishing the pivot point.

7. The aircraft of claim 3, wherein said first connecting means further includes a second pair of tubes having upper ends respectively connected to leading and trailing wing edges at inwardly spaced locations from upper ends of the first pair of tubes, lower ends of the second tubes projecting downward from the wing for attachment to a second plate being unconnected to the first plate and suspended by the second tubes between the fuselage and wing, and a second pair of cables connected between the second plate to separate points on the fuselage, said second plate establishing a pivot point located in the same elevational and vertical planes as the hinge axis and as the pivot point on the first plate such that rotation of the wing about the hinge induces corresponding rotation of the first and second pairs of tubes about their respective pivot points without varying dihedral and wing twist.

8. The aircraft of claim 7, wherein said short longitudinal tubes are performed into a curved shape approximating the shape of the airfoil, said keel being a generally straight tube of larger diameter than the remaining short longitudinal tubes.

9. The aircraft of claim 17, wherein said aircraft is an ultra-light and said fuselage is a hang cage having plural tubular members connected to define a base frame for containing a pilot therewithin and a means for supporting an engine and fuel supply means on the base frame, said hang cage further including plural upwardly extending struts attached at upper ends thereof to the pitch hinge bracket means.

10. The aircraft of claim 9, wherein said pitch hinge bracket means includes a longitudinally extending upper sleeve member integrally formed with a pair of longitudinal parallel bracket arms extending downwardly therefrom, said sleeve defining a longitudinal mounting channel receiving the keel and clamping engagement, ball joint connect means located between the bracket arms defining a rotational axis of said wing being generally parallel to the spanwise axis, and hinge connecting plate means for connecting the ball joint connection means to the upwardly extending struts, said rotational axis being colinear with the pivot points respectively established on the first and second plates.

11. The aircraft of claim 10, wherein said ball joint connection means includes a stub shaft extending transversely between the bracket arms, a spherical ball carried on the stub shaft, and a rod and bearing shaft an upper end of which having a socket with a concave cylindrical track surrounding the spherical ball, a lower shaft portion of said rod and bearing shaft being received within a hollow cylindrical sleeve affixed thereto by a locking pin passing radially through the sleeve and shaft, wherein said hinge connecting plate means includes a pair of hinge connecting plates with upper ends thereof bolted to said lower shaft portion.

12. The aircraft of claim 11, further including means for releasably mounting the ball joint connection means between the bracket arms to thereby quickly detach the wing from the hang cage.

13. The aircraft of claim 7, wherein said first and second plates are generally triangularly shaped, and inverted so that lower ends of the first and second pairs of tubes are attached to upper corners respectively of the first and second plates and upper ends of the first and second pairs of cables are attached respectively to the lower end or apex of the first and second plates.

14. An aircraft, comprising:
(a) a fuselage;
(b) a wing;
(c) a pitch hinge bracket connecting the fuselage to the wing, said hinge bracket permitting the wing to freely rotate without pilot intervention about a spanwise axis extending generally perpendicular to the longitudinal axis of the wing so that lifting surfaces of the wing maintain a substantially constant angle of attack irrespective of abrupt changes in relative wind tending to be caused by wind gusts;
(d) a plurality of landing wires connected to portions of the wing remote from the hinge and extending above the wing and a plurality of flying wires extending below the wing to connect portions of the wing remote from the hinge to the fuselage, said landing wires and flying wires being tensioned to establish within the wing a fixed invariable amount of wing twist or dihedral, portions of said wing by virtue of said wing twist or dihedral being located above a spanwise hinge axis about which said wing is free to rotate; and
(e) pivot means connected to the flying wires and being suspended thereby for location on said spanwise axis to establish a pivot point about which portions of said connecting means and said flying wires are displaceable in response to wing rotation, said pivot means enabling the flying wires to pivot about the pivot point as the wing rotates about the spanwise axis to thereby avoid interfering with rotational movement of the wing about the hinge while the connecting means and flying wires transmits tension from the wing to the fuselage.

15. An aircraft, comprising:
(a) a fuselage;
(b) a rigid wing having forward and rear tubular members acting as load bearing members connected to extend transversely from opposite sides of the fuselage to respectively establish leading and trailing wing edges, said forward and rear members being connected together by short longitudinal tubes to define a wing frame therewith with one of said tubes located centrally between opposite ends of the wing being a keel, and fabric material and the like covering the wing frame to establish lifting surfaces exposed to relative wind during flight to create lift;
(c) a pitch hinge bracket means for connecting the fuselage to the keel, said hinge bracket means permitting the rigid wing to rotate freely without pilot intervention about a spanwise axis extending generally perpendicular to the longitudinal axis of the keel so that lifting surfaces of the wing maintain a substantially constant angle of attack irrespective of abrupt changes in relative wind tending to be caused by wind gusts; and
(d) first means for connecting the load bearing members of the wing to the fuselage, said first means establishing a pivot located in the same elevational plane as the hinge so that portions of the connecting means extending above the pivot together with a part of the wing load bearing members define a first plane and portions of the connecting means extending below the pivot together with a part of the fuselage define a second plane being generally coplanar with the first plane so that the connecting means and load bearing wing members establishing the first and second planes are free to move relative to each other by twisting movement about the pivot in response to rotation of the wing while remaining within their respective plane so that bending stress in the wing is distributed through the connecting means to the fuselage, the connecting means and load bearing wing members establishing and moving within said first and second planes enabling the pivot to remain generally colinear with the hinge axis as the wing rotates while transmitting bending stress loads acting on the wing to the fuselage.

16. An aircraft, comprising:
(a) a fuselage;
(b) a rigid wing having forward and rear tubular members connected to extend transversely from opposite sides of the fuselage to respectively establish leading and trailing wing edges, said forward and rear members being connected together by short longitudinal tubes to define a wing frame therewith with one of said tubes located centrally between opposite ends of the wing being a keel, and fabric material and the like covering the wing frame to establish lifting surfaces exposed to relative wing during flight to create lift;
(c) a pitch hinge bracket means connecting the fuselage to the keel, said hinge bracket means permitting the rigid wing to freely rotate without pilot intervention about a spanwise axis extending generally perpendicular to the keel longitudinal axis so that the lifting surfaces of the wing maintain a substantially constant angle of attack irrespective of abrupt changes in relative wind tending to be caused by wind gusts; and
(d) means connecting load bearing members of the wing to the fuselage, said means establishing a pivot point located in the same elevational plane as the hinge so that portions of the connecting means extending upward above the pivot point define a first plane established with a part of the wing load bearing members and portions of the connecting means extending downward from the pivot point define a second plane established with a part of the fuselage so that the first and second planes are free to twist relative to each other and in a direction generally orthogonal to their planes and about the pivot point in response to rotation of the wing enabling the pivot point to remain generally immovable in said elevational plane.

17. An aircraft, comprising:
(a) a fuselage;
(b) a wing;
(c) a pitch hinge bracket means connecting the fuselage to the wing, said hinge bracket means permitting the wing to freely rotate without pilot intervention about a spanwise axis extending generally perpendicular to the longitudinal axis of the wing so that lifting surfaces of the wing maintain a substantially constant angle of attack irrespective of abrupt changes in relative wind tending to be caused by wind gusts;
(d) means connecting portions of the wing proximate the leading and trailing edges thereof to the fuselage at a section of the wing remote from the hinge for establishing a fixed, invariable amount of wing twist or dihedral, said means being tensioned and operable to transmit bending stress loads from the wing to the fuselage to alleviate excessive wing loading, said connecting means including means for automatically displacing, in response to rotation of the wing about the hinge axis, (1) a first effective length of the connecting means extending between a point of connection thereof with a portion of the wing proximate the leading edge to a point of connection on the fuselage and (2) a second effective length of the connecting means extending between a point of connection with a portion of the wing proximate the trailing edge thereof to a point of connection on the fuselage, said automatic displacement means thereby enabling the connecting means to remain under constant tension without interfering with rotational movement of the wing about the hinge.

18. An aircraft, comprising:
(a) a fuselage;
(b) a wing;
(c) a pitch hinge bracket means connecting the fuselage to the wing, said hinge bracket means permitting the wing to freely rotate without pilot intervention about a spanwise axis extending generally perpendicular to the longitudinal axis of the fuselage so that lifting surfaces of the wing maintain a substantially constant angle of attack irrespective of abrupt changes in relative wind intending to be caused by wind gusts; and
(d) means connecting a section of the wing remote from the hinge to the fuselage for establishing a fixed invariable amount of wing twist or dihedral, said means being tensioned and operable to transmit bending stress loads from the wing to the fuselage to alleviate excessive wing loading, said connecting means including means for automatically displacing, in response to rotation of the wing about the hinge, (1) a first effective length of the connecting means extending between a point of connection thereof with the wing to a point of connection on the fuselage and (2) a second effective length of the connecting means extending between said point of connection thereof on the wing to a second point of connection on the fuselage, said automatic displacement means thereby enabling the connecting means to remain under constant tension without interfering with rotational movement of the wing about the hinge.

19. The aircraft of claim 18, wherein said separate points of attachment of the connecting means to the fuselage are respectively located in planes extending parallel with the spanwise axis and orthogonal to the fuselage longitudinal axis fore and aft of the hinge.

* * * * *